US007814157B2

(12) United States Patent
Doyle

(10) Patent No.: US 7,814,157 B2
(45) Date of Patent: Oct. 12, 2010

(54) HYPERMEDIA BROWSER API SIMULATION TO ENABLE USE OF BROWSER PLUG-INS AND APPLETS AS EMBEDDED WIDGETS IN SCRIPT-LANGUAGE-BASED INTERACTIVE PROGRAMS

(75) Inventor: Michael D. Doyle, Wheaton, IL (US)

(73) Assignee: Eolas Technlogies, Inc., Tyler, TX (US)

( * ) Notice: Subject to any disclaimer, the term of this patent is extended or adjusted under 35 U.S.C. 154(b) by 587 days.

(21) Appl. No.: 11/058,436

(22) Filed: Feb. 14, 2005

(65) Prior Publication Data

US 2006/0129982 A1 Jun. 15, 2006

Related U.S. Application Data

(63) Continuation of application No. 09/481,984, filed on Jan. 11, 2000, now Pat. No. 6,857,124.

(51) Int. Cl.
*G06F 15/16* (2006.01)
(52) U.S. Cl. .................. 709/206; 370/389; 370/392
(58) Field of Classification Search .......... 709/216–226
See application file for complete search history.

(56) References Cited

U.S. PATENT DOCUMENTS

| 5,528,503 | A | * | 6/1996 | Moore et al. ................. 700/95 |
| 5,572,643 | A | * | 11/1996 | Judson ....................... 709/218 |
| 5,761,683 | A | * | 6/1998 | Logan et al. ................. 715/513 |
| 5,764,902 | A | * | 6/1998 | Rothrock .................... 709/205 |
| 5,819,092 | A | * | 10/1998 | Ferguson et al. ............ 717/113 |
| 5,822,539 | A | * | 10/1998 | van Hoff .................... 709/239 |
| 5,826,025 | A | * | 10/1998 | Gramlich ................... 709/217 |
| 5,835,712 | A | * | 11/1998 | DuFresne ................... 709/203 |
| 5,835,914 | A | * | 11/1998 | Brim ......................... 707/206 |
| 5,838,906 | A | * | 11/1998 | Doyle et al. ................. 715/205 |
| 5,845,075 | A | * | 12/1998 | Uhler et al. ................. 709/200 |
| 5,890,158 | A | * | 3/1999 | House et al. .................. 707/10 |
| 5,890,171 | A | * | 3/1999 | Blumer et al. ........... 715/501.1 |
| 5,958,008 | A | * | 9/1999 | Pogrebisky et al. ......... 709/223 |
| 6,035,119 | A |   | 3/2000 | Massena |
| 6,083,276 | A |   | 7/2000 | Davidson |
| 6,161,126 | A |   | 12/2000 | Wies |
| 6,167,253 | A |   | 12/2000 | Farris |
| 6,173,437 | B1 | * | 1/2001 | Polcyn ....................... 717/100 |
| 6,188,401 | B1 |   | 2/2001 | Peyer |

(Continued)

OTHER PUBLICATIONS

"Scripting:Higher Level Programming for the 21st Century," John Ousterhout, IEEE Computer, Marc.

*Primary Examiner*—Dohm Chankong
*Assistant Examiner*—Tauqir Hussain
(74) *Attorney, Agent, or Firm*—Charles E. Krueger

(57) ABSTRACT

A system is described which provides the capability for high-level extensible scripting language interpreters to incorporate and employ Web browser plug-ins as components within script-based programs. A script interpreter extension is described which simulates the plug-in API interface of a Web browser, from the point of view of the browser plug-in, to allow program scripts to cause browser plug-ins to be launched and manipulated, in a manner similar to the scripting platform's native widgets, from within the executing program script. This system allows embedded external program objects to be used to display and enable interactive processing of embedded data objects.

2 Claims, 2 Drawing Sheets

Figure 1: A layer diagram of a typical implementation of the invention using a scripting language platform such as Tcl/Tk. A script interpreter extension provides functions that mimic the browser-side interface of a Web browser plug-in API

U.S. PATENT DOCUMENTS

| | | | |
|---|---|---|---|
| 6,189,000 B1 * | 2/2001 | Gwertzman et al. ............ 707/1 |
| 6,216,141 B1 | 4/2001 | Straub |
| 6,249,882 B1 * | 6/2001 | Testardi ...................... 714/38 |
| 6,266,056 B1 | 7/2001 | Kanungo |
| 6,266,681 B1 * | 7/2001 | Guthrie .................... 715/501.1 |
| 2002/0129064 A1 * | 9/2002 | Guthrie ...................... 707/513 |
| 2004/0051716 A1 * | 3/2004 | Sevigny ...................... 345/589 |

* cited by examiner

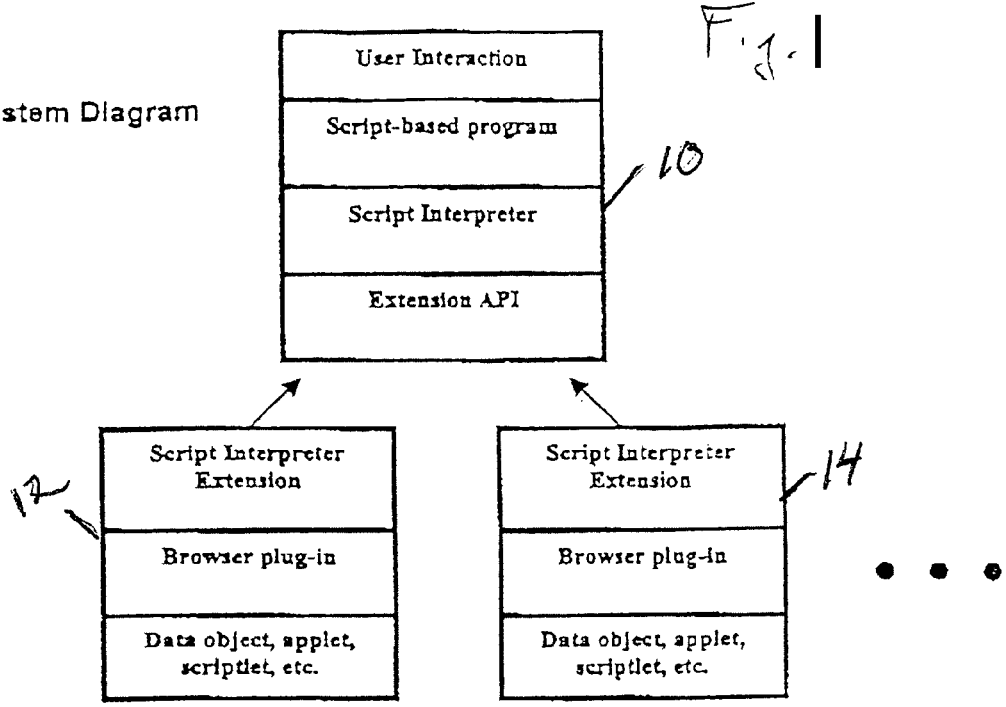
Figure 1: A layer diagram of a typical implementation of the invention using a scripting language platform such as Tcl/Tk. A script interpreter extension provides functions that mimic the browser-side interface of a Web browser plug-in API
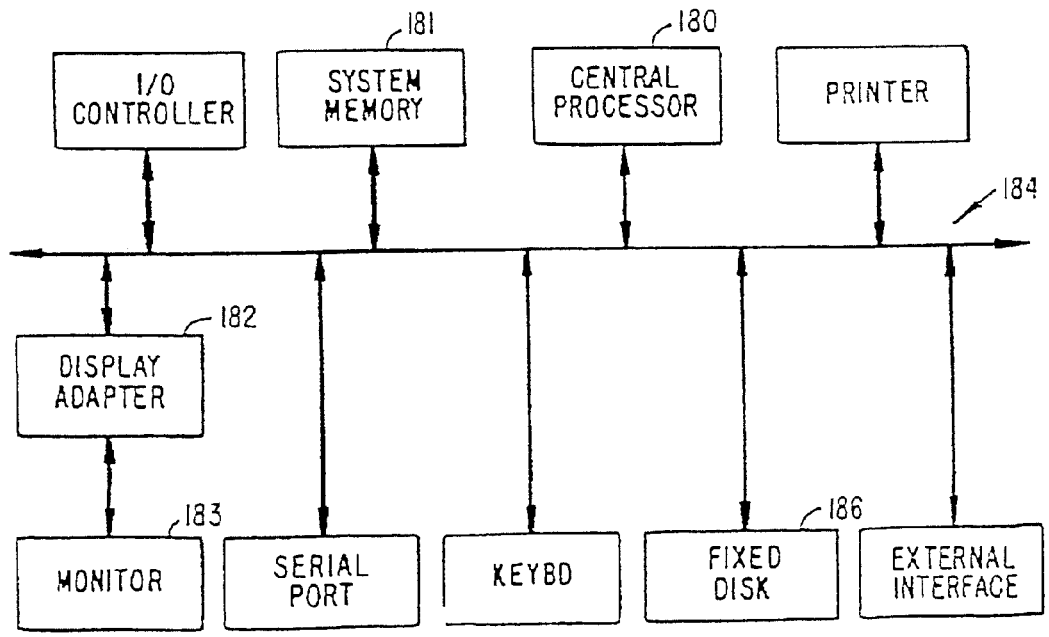
Fig. 2

HYPERMEDIA BROWSER API SIMULATION TO ENABLE USE OF BROWSER PLUG-INS AND APPLETS AS EMBEDDED WIDGETS IN SCRIPT-LANGUAGE-BASED INTERACTIVE PROGRAMS

CROSS-REFERENCE TO RELATED APPLICATION

This application is a continuation of and claims the benefit of U.S. patent application Ser. No. 09/481,984, filed Jan. 11, 2000, now U.S. Pat. No. 6,857,124, the disclosure of which is incorporated herein by reference.

BACKGROUND OF THE INVENTION

The Interactive Content Paradigm

Computer application paradigms go through a constant process of evolution. Fifteen years ago, personal productivity applications typically were text-based, ran in full screen mode, and each application tended to employ a unique set of user interaction commands. As multi-windowed graphical user interface systems became popular, applications developed for these environments began to adopt standard types of interface models, to minimize users' confusion as they switched back and forth among multiple open applications. As a result of feature competition among vendors, productivity applications built for these windowed environments began to grow larger and larger. Simultaneously, users began to demand easy transfer of data between documents created with various applications. This led to the creation of compound-document architectures, such as Microsoft's Object Linking and Embedding (OLE) system. OLE-based applications were designed from a document-centric mindset, allowing several large monolithic productivity applications to share a single document view and "trade off" the graphical interface, so that the user wouldn't have to move his or her eyes away from the document being worked upon as each application was interactively activated (usually with a double click on a bitmap in the document) by the user. This model worked well enough when only a few major applications were involved, and when the user was primarily interested in editing documents which would be printed for use. The growth of the Web, however, ushered in a new use for document files—as a direct tool for networked communications and information retrieval.

The Web's new plug-in and applet technology created a new paradigm for application development. This new system focused on the document as a container for multiple small embedded program objects, rather than as the OLE-style task switcher of the Windows model. This new system also ushered in a new interaction paradigm, as well. The Web document became the primary application, with the document automatically choreographing the collection of document component data and the activation of the embedded applications necessary to present the user with a single and seamless interactive interface to the document's content.

The UCSF/Eolas WAPI

The Web-document-as-application model was first established at the University of California, San Francisco's Center for Knowledge Management. Their work, and their proposal for a standard Web API (WAPI), was described in the lead article of the February, 1996, issue of *Dr. Dobb's Journal*. This technology allowed the creation and use of "plug-in" applications that Web content authors could easily employ to dynamically extend the functionality of WAPI-enhanced Web browsers and Web pages at viewing time, without having to modify the actual browser code. Although WAPI did not, itself, become an industry standard, it inspired later commercial systems that went on to transform the entire computer software industry.

The Netscape Plug-In API

Essentially modeled upon the UCSF/Eolas WAPI, the Netscape browser plug-in API created a de-facto standard that has been implemented in all major browsers. This resulted in the subsequent development of hundreds of plug-ins that were then made freely available online, all of which conform to a standard architecture. The availability of such a large number of application components has made the very popular and powerful platform for application development. The Web document parsing model allows late binding of these application components, together with runtime fetching of component-specific data objects, thereby insuring that users can both always enjoy the latest improvements to component programs and always see the latest updates to embedded object data. It also allows application design to be independent of underlying computer system architecture. This has proven to be a very effective means for application integration with legacy software systems, proving very popular among corporate applications developers.

Scripting Languages

Modern scripting languages, such as Tcl/Tk, provide the ability to write text scripts which define interactive applications through run-time parsing of script files. Similar to the situation with Web pages, this type of architecture provides for late binding of application functionality through such runtime script parsing. Tcl/Tk provides a standard APIs for enhancing both the command set and widget set of the interpreter through interpreter extension that are loaded at runtime. Although this provides some advantages similar to those of browser plug-ins, there are not nearly as many widget extensions available as there are browser plug-ins. Furthermore, the interpreter extension mechanism did not make provision for late binding of component application code with application data, as the browser plug-in model does.

What is Needed

A system is needed that allows general program development systems to benefit from the large number of embeddable applications, in the form of browser plug-ins, that are available to easily expand the functionality of these development platforms at run-time, as well as to provide runtime binding of component logic with remotely-networked data objects.

SUMMARY OF THE INVENTION

The present invention provides these useful advantages through the novel and counterintuitive synthesis of existing industry-standard Web browser technology with script language interpreter extension technology. Although widgets are developed specifically for use as extensions to a particular scripting language the base to support development of such applications is small compared with the base to support development of plug-in applications. Thus, the present invention allows script based applications to tap into the vast pool of functional resources provided by web-browser plug-in applications.

According to one aspect of the invention, plug-in extension code includes code for parsing a program script to detect an embed command, for fetching an object referenced by the embed command, and simulating a web-browser interface to automatically invoke a web-browser plug-in identified by the data format of the object.

According to another aspect of the invention, the plug-in interface allows web-browser plug-ins to be used by the script-based application as embedded widgets.

According to another aspect of the invention, the plug-in interface allows the plug-in application to interactively display and manipulate the object in a child window controlled by the script-based application.

According to another aspect of the invention, the object if fetched using standard internet protocols such as http or file access.

According to another aspect of the invention, the interpreter extension mechanism provides for late binding of code and application data.

Other features and advantages of the invention will be apparent in view of the following detailed description and appended drawings.

BRIEF DESCRIPTION OF THE DRAWINGS

FIG. 1 is a layer diagram of a preferred embodiment of the invention;

FIG. 2 is a block diagram of a standard computer system; and

DESCRIPTION OF THE SPECIFIC EMBODIMENTS

Figure 3:
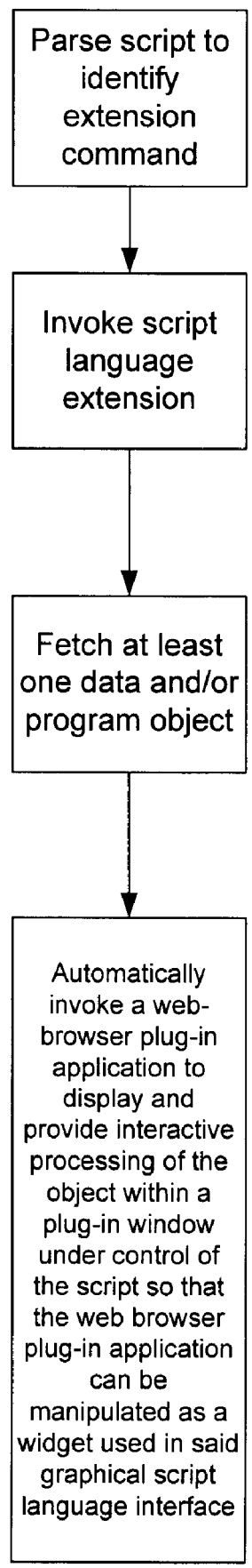
FIG. 3 is a flow chart illustrating steps performed by an example embodiment.

A preferred embodiment will now be described that utilizes the Tool Command Language and Tool Kit (Tcl/Tk) which is scripting language useful for WWW-based applications. Tcl/Tk was developed by John Ousterhout and is described in his book entitled, *Tcl and the Tk Toolkit*, Addison-Wesley, ISBN 0-201-63337-X, 1994. However, the invention is generally applicable to any scripting language such as, for example, Perl, Python, Rexx, or Visual Basic.

In a preferred embodiment, an extension to a scripting language simulates a browser from the point of view of a plug-in, in order for the plug-in to be embeddable within a script program interface, and manipulable in a manner similar to a native widget. Program code in the extension provides the same functions and interfaces to a plug-in as provided by an industry-standard Web browser application programming interface (API). From the plug-in's viewpoint, the extension appears to be a conventional Web browser. Data objects are referenced in "SRC" parameters in the scripting language command syntax. These data files are fetched at run time using standard Web protocol conventions (e.g.: http or file access). The script text file is parsed by the script interpreter at run time to identify language commands. A new script command is created which mimics a standard hypermedia embed text format. This command then causes the plug-in-interface extension to invoke code in the extension that allows the browser plug-in to be automatically invoked in order to allow display and interaction with embedded objects, whereby those embedded objects are treated by the scripting language platform as interactive widgets which can be embedded within the script program graphical user interface.

One embodiment of the invention employs a "wrapper" utility, written in the script language, which defines a procedure which is able to parse and respond to an embed text format (an EMBED tag) which may be copied from a conventional HTML page and pasted into a program script. The wrapper utility procedure does this by parsing the EMBED tag, fetching the file defined by the "src=" attribute of the tag, and invoking the plug-in extension, while passing any associated EMBED tag parameters to the plug-in as passed arguments via the script language's argument passing mechanism.

FIG. 1 is a layer diagram of a preferred embodiment of the invention. The upper block 10 of FIG. 1 represents a standard scripting language configuration including a user-interaction interface, script-based program, script interpreter, and extension API.

Sub-blocks 12 and 14 represent different script interpreter plug-in extensions sub-blocks. Each sub-block includes a plug-in extension which simulates a web-browser interface to the browser plug-in application and also allows the plug-in application to interactively control and manipulate the fetched object in window controlled by the script-based program.

The following is a list of API functions simulated by the plug-extension in a preferred embodiment to simulate the plug-in interface of a Netscape web-browser:

Example Netscape browser plug-in API functions to be simulated:

```
#ifdef XP_UNIX
    NPError   NPN_GetValue(NPP instance, NPNVariable variable,
    void *value);
#endif/* XP_UNIX */
    void        NPN_Version(int*plugin_major,
    int*plugin_minor,
                int*netscape_major, int* netscape_minor);
    NPError NPN_GetURLNotify(NPP instance, conist char* url,
                const char* target, void* notifyData);
    NPError NPN_GetURL(NPP instance, const char* url, const
    char* target);
    NPError NPN_PostURLNolify(NPP instance, const char* url,
                const char* target, uint32 len, const char* buf,
                NPBool file,
                void* notifyData);
    NPError NPN_PostURL(NPP instance, const char* url,
                const char* target, uint32 len, const char* buf;
            NPBool file);
    NPError NPN_RequestRead(NPStream* stream, NPByteRange*
    rangeList);
    NPError NPN_NewStream(NPP Instance, NPMIMEType type,
    const char*
            target, NPStream** stream);
    int32       NPN_Write(NPP instance, NPStream* stream,
    int32 len, void*
            buffer);
    NpError NPN_DestroyStream(NPP instance, NPStream*
    stream, NPReason
            reason);
    void        NPN_Status(NPP instance, const char*
    message);
    const char* NPN_UserAgent(NPP instance);
    vold*       NPN_MemAlloc(uint32 size);
    void        NPN_MemFree(void* ptr);
    uint32    NPN_MemFlush(uint32 size);
    void        NPN_ReloadPlugins(NPBool reloadPages);
    JRIEnv*NPN_Get_JavaEnv(void);
    jref      NPN_GetJavaPeer(NPP instance);
```

| Function name | Description |
|---|---|
| NPN_GetValue | Get a value |
| NPN_Vetsion | Return the major & minor version Numbers for the Plugin protocol |
| NPN_GetURLNotify | Get a Stream URL and return the result via a call to NPP_URLNotify |
| NPN_GetURL | Get data from a URL. |
| NPN_PostURLNotify | Post data to a server. |
| NPN_PostURL | Post data to a server. |
| NPN_RequestRead | Request a range of bytes from a seekable stream to be sent to the plugin in |

-continued

| Function name | Description |
| --- | --- |
| | subsequent NPP_Write calls, An fseek equivalent. |
| NPN_NewStream | Creates a new stream for data flow from plug-in to browser. |
| NPN_Write | Called from the plugin to write data to a stream created with NPN_NewStream. |
| NPN_DestroyStream | Destroy the stream created with the NewStream call. |
| NPN_Status | A line of text sent by the plugin to the browser, ostensibly to display on the 'status' line. |
| NPN_UserAgent | Retrieves the User-Agent field from the Navigator. Just ship back a pro-defined string? |
| NPN_MemAlloc | Allocates memory, map to TclAlloc. |
| NPN_MemFree | Frees memory, map to TclFree. |
| NPN_MemFlush | Frees memory in the browser to make more room for plugin. |
| NPN_GetJavaEnv | Returns the Java execution environment. |
| NW_GetJavaPeer | Returns the plug-in associated with a Java object. |

Summary of Basic System Elements for a Tcl/Tk Implementation.

A new set of Tcl commands that load and operate plug-ins. Code in the plug-in-interface extension (a Tcl/Tk loadable extension, see Practical Programming in Tcl/Tk, by Brent B. Welch, 2nd Edition, pub: (1997) Prentice Hall; ISBN: 0136168302 reference for Tcl/Tk extension API) provide the same functions and interfaces to a plug-in as provided by an industry-standard Web browser Parsing code in the plug-in-interface extension allows the standard <EMBED . . . > tag parameters to be passed as part of the Tcl command call Code in the plug-in-interface extension allows data objects referenced in "SRC" parameters to be fetched using standard conventions (e.g.: http or file access)

Code in the plug-in-interface extension allows script to be parsed to identify embed text formats and to automatically invoke the browser plug-in application Code in the plug-in-interface extension allows the plug-in application to be automatically invoked to allow display and interaction with embedded objects, whereby those embedded objects and their associated plug-in applications are treated by the scripting language platform as widgets.

Code in the plug-in-interface extension allows the plug-in application to display and provide interactive processing of a data and/or program object within a child window, said window which is embedded within a Tcl/Tk-controlled window, under control of the program script.

The details of the implementation of a preferred embodiment are set forth in the source code appendix to this patent application.

FIG. 2 is an illustration of basic subsystems of a computer system suitable for use with the present invention. In FIG. 2, subsystems are represented by blocks such as central processor 180, system memory 181 consisting of random access memory (RAM) and/or read-only memory (ROM), display adapter 182, monitor 183 (equivalent to display device 153 of FIG. 3), etc. The subsystems are interconnected via a system bus 184. Additional subsystems such as a printer, keyboard, fixed disk and others are shown. Peripherals and input/output (I/O) devices can be connected to the computer system by, for example serial port 185. For example, serial port 185 can be used to connect the computer system to a modem for connection to a network or serial port 185 can be used to interface with a mouse input device. The interconnection via system bus 184 allows central processor 180 to communicate with each subsystem and to control the execution of instructions from system memory 181 or fixed disk 186, and the exchange of information between subsystems. Other arrangements of subsystems and interconnections are possible.

The invention has now been described with reference to the preferred embodiments. Alternatives and substitutions will now be apparent to persons of skill in the art. In particular, the invention is applicable to all extensible scripting languages and is not limited to any particular set of existing scripting languages. The differences between scripting languages and system languages and the fundamental characteristics of scripting languages are set forth in an article by John Ousterhout entitled, *Scripting: Higher Level Programming for the 21st Century, IEEE Computer Magazine*, March, 1998.

Further, although the preferred embodiment simulates the plug-in interface of a Netscape browser application, the nature of extensible scripting language allows the principles of the invention to be extended to any browser application.

Accordingly, it is not intended to limit the invention except as provided by the appended claims.

What is claimed is:

1. One or more non-transitory computer readable storage media with an executable program stored thereon, wherein the program instructs a processor to perform the following steps:

parsing a script, with the script written in a scripting language and for execution on a scripting platform which is not a web browser application, to identify an extension command of the scripting language that mimics a standard hypermedia embed text format and to identify a source locator parameter included in the syntax of the extension command, with the extension command invoking a plug-in-interface scripting language extension of the scripting language that simulates a browser from the point of view of a browser plug-in application to enhance the widget set and where the plug-in-interface scripting language extension provides the same functions and interfaces to a browser plug-in application as provided by a web browser application, with the widget set native to the scripting language and used in a graphical script language interface, so that the plug-in-interface scripting language extension enhances the widget set to include web browser plug-in applications designed to extend the functionality of web browser programs, where the extension command is added to the scripting language and with the extension command syntax including the source locator parameter;

fetching at least one data and/or program object referenced by the source locator parameter, when the extension command is identified, using standard internet procedures; and automatically invoking, the web browser plug-in application to display and provide interactive processing of the object within a plug-in-interface window under control of the script language interface so that the web browser plug-in application can be manipulated as a widget used in said graphical script language interface.

2. The one or more non-transitory computer readable storage media of claim 1 wherein the program further instructs the processor to perform the following step:

responding to an embed text format copied from a conventional HTML page and pasted into a script.

* * * * *